(12) United States Patent
Martin et al.

(10) Patent No.: US 11,922,409 B2
(45) Date of Patent: Mar. 5, 2024

(54) USER-LINKED PAYMENT METHODS FOR COMPLETION OF AN ONLINE TRANSACTION

(71) Applicant: Skipify, Inc., San Mateo, CA (US)

(72) Inventors: Erythean Martin, Danville, CA (US); Rashad Itani, San Jose, CA (US); Zach Thigpen, San Francisco, CA (US); Jeremiah Anderson, Los Altos, CA (US); Steve Almeida, San Francisco, CA (US)

(73) Assignee: SKIPIFY, INC., San Mateo, CA (US)

( * ) Notice: Subject to any disclaimer, the term of this patent is extended or adjusted under 35 U.S.C. 154(b) by 0 days.

(21) Appl. No.: 18/127,666

(22) Filed: Mar. 29, 2023

(65) Prior Publication Data

US 2023/0230073 A1 Jul. 20, 2023

Related U.S. Application Data

(63) Continuation of application No. 17/844,694, filed on Jun. 20, 2022, which is a continuation-in-part of application No. 17/552,304, filed on Dec. 15, 2021.

(51) Int. Cl.
G06Q 20/38 (2012.01)
H04L 9/40 (2022.01)

(52) U.S. Cl.
CPC ..... *G06Q 20/3821* (2013.01); *H04L 63/0838* (2013.01)

(58) Field of Classification Search
CPC ................................ G06Q 20/3821
USPC ............................................... 705/44
See application file for complete search history.

(56) References Cited

U.S. PATENT DOCUMENTS

| | | | |
|---|---|---|---|
| 9,275,387 B1* | 3/2016 | Spector | G06Q 20/367 |
| 2015/0088756 A1* | 3/2015 | Makhotin | G06Q 20/32 |
| | | | 705/71 |
| 2015/0332262 A1 | 11/2015 | Lingappa | |
| 2016/0364723 A1* | 12/2016 | Reese | G06Q 20/38215 |
| 2017/0011395 A1 | 1/2017 | Pillai et al. | |
| 2017/0103388 A1 | 4/2017 | Pillai et al. | |
| 2017/0213212 A1* | 7/2017 | Dicker | G06Q 20/3821 |

(Continued)

*Primary Examiner* — Lindsay M Maguire
(74) *Attorney, Agent, or Firm* — SU IP CONSULTING

(57) ABSTRACT

A computer-implemented method of providing payment methods for an online transaction includes: receiving an unencrypted shopper identifier credential that is associated with a specific user and is input via a checkout user interface, wherein the checkout user interface is associated with the online transaction and is displayed at a user device; in response to receiving the unencrypted shopper identifier credential, generating a first encrypted shopper identifier credential based on the unencrypted shopper identifier credential; sending a first query that includes the first encrypted shopper identifier credential to a first payment instrument manager, wherein the first query requests an indication that the first encrypted shopper identifier credential is associated with an account for the first payment instrument manager; receiving a response from the first payment instrument manager that includes the indication; and causing the checkout user interface to be modified with a selection field, wherein the selection field is associated with the first payment instrument manager.

24 Claims, 8 Drawing Sheets

(56) References Cited

U.S. PATENT DOCUMENTS

2017/0221055 A1\* 8/2017 Carlsson ................ G06Q 20/40
2021/0118039 A1\* 4/2021 Martin .................. G06F 21/602

\* cited by examiner

USER-LINKED PAYMENT METHODS FOR COMPLETION OF AN ONLINE TRANSACTION

CROSS-REFERENCE TO RELATED APPLICATIONS

The present application is a continuation under 35 U.S.C. § 120 of U.S. patent application Ser. No. 17/844,694, filed Jun. 20, 2022, which is a continuation-in-part application of U.S. application Ser. No. 17/552,304, filed Dec. 15, 2021. The aforementioned U.S. Patent Applications, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

The development of e-commerce has enabled merchants and manufacturers to electronically combine advertising and presentation of products and services with receiving orders for such products directly from a customer. Thus, manufacturers and/or sellers of products and services can both describe a product to a customer and receive electronically transmitted orders from the customer for the product, for example, through an Internet web site. In this way, e-commerce facilitates the selection and ordering process, greatly increasing sales.

However, there are still sources of friction in e-commerce that impede the completion of an online sale. For example, checkout methods available to online shoppers typically include manually filling out multi-page, multi-field forms, a process that is sufficiently time-consuming that many online shoppers are discouraged from completing a transaction. In addition, manual form completion is subject to human error, which can result in shipping and/or billing issues that create significant customer dissatisfaction with the online shipping experience.

To further reduce friction in online shopping, certain payment facilitation tools, such as PayPal™, Apple Pay™, Google Pay™, and Amazon Pay™, have been designed to reduce manual field entry. However, to complete an online transaction, such payment facilitation tools still require additional login steps, transfer of a shopper onto a separate website associated with the payment facilitator site, and/or payment and shipping confirmation actions. Such additional actions and Internet redirections can cause delays and other friction that lower the rate of completed transactions by the online shopper. In addition, significant engineering effort is required on the part of the merchant to enable such automation for each individual payment facilitation tool, which can be problematic for smaller merchants.

Further, since in-person identity verification is impossible in an online sale, another issue with e-commerce processes is that verifying whether an online shopper is the authorized user of a credit card is more difficult for electronic transactions. As a result, the development of e-commerce has rendered credit card companies and credit card holders more vulnerable to unauthorized charges that are conducted through e-commerce processes and methods. Consequently, many online shoppers are often hesitant to enter sensitive credit card information into the checkout page of many merchant websites, further lowering the rate of completed transactions by such online shoppers.

SUMMARY

In accordance with at least some embodiments of the present disclosure, an online purchase network facilitates an online transaction by an online shopper on a merchant website. Specifically, the online purchase network enables the online shopper to initiate the online transaction on the merchant website and complete a checkout process for the online transaction through the merchant website, including payment. In some embodiments, payment methods that are known to be available to that particular online shopper are displayed on a user device during the checkout process as part of a checkout user interface (UI) that is associated with the merchant website. That is, the checkout UI associated with the merchant website is populated with one or more selection fields, where each selection field is associated with a different issuing bank or other payment instrument manager at which the particular shopper has an account. In the embodiments, the checkout UI is populated with one or more selection fields in response to the online shopper entering an unencrypted shopper identifier credential, such as a registered email address, phone number, or other identifier. Thus, by entering the unencrypted shopper identifier credential into the checkout UI, suitable secure payment methods are made available to the online shopper without redirecting the online shopper to the website of a payment instrument manager, such as an issuing bank or other card issuer, a mobile payment service, a digital wallet service, or a token vault or other entity that stores payment instrument data of individual users or shoppers. In addition, by entering the unencrypted shopper identifier credential into the checkout UI, suitable secure payment methods are made available to the online shopper without requiring the online shopper to enter credit card information into the merchant website.

Some embodiments include a computer-implemented method of providing a payment method for an online transaction. Such embodiments include: receiving an unencrypted shopper identifier credential that is associated with a specific user and is input via a checkout user interface, wherein the checkout user interface is associated with the online transaction and is displayed at a user device; in response to receiving the unencrypted shopper identifier credential, generating a first encrypted shopper identifier credential based on the unencrypted shopper identifier credential; sending a first query that includes the first encrypted shopper identifier credential to a first payment instrument manager, wherein the first query requests an indication that the first encrypted shopper identifier credential is associated with an account for the first payment instrument manager; receiving a response from the first payment instrument manager that includes the indication; and causing the checkout user interface to be modified with a selection field, wherein the selection field is associated with the first payment instrument manager.

Some embodiments include a computer-implemented method of completing an online transaction. Such embodiments include: receiving an unencrypted shopper identifier credential that is associated with a specific user and is input via a checkout user interface, wherein the checkout user interface is associated with the online transaction and is displayed at a user device; in response to receiving the unencrypted shopper identifier credential, generating a first encrypted shopper identifier credential based on the unencrypted shopper identifier credential; sending a first query that includes the first encrypted shopper identifier credential to a first payment instrument manager; and when the first encrypted shopper identifier credential is associated with an account with the payment instrument manager, receiving a response from the payment instrument manager that includes payment instrument data associated with the account.

Further embodiments include a non-transitory computer-readable storage medium comprising instructions that cause a computer system to carry out one or more of the above methods, as well as a computer system configured to carry out one or more of the above methods.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
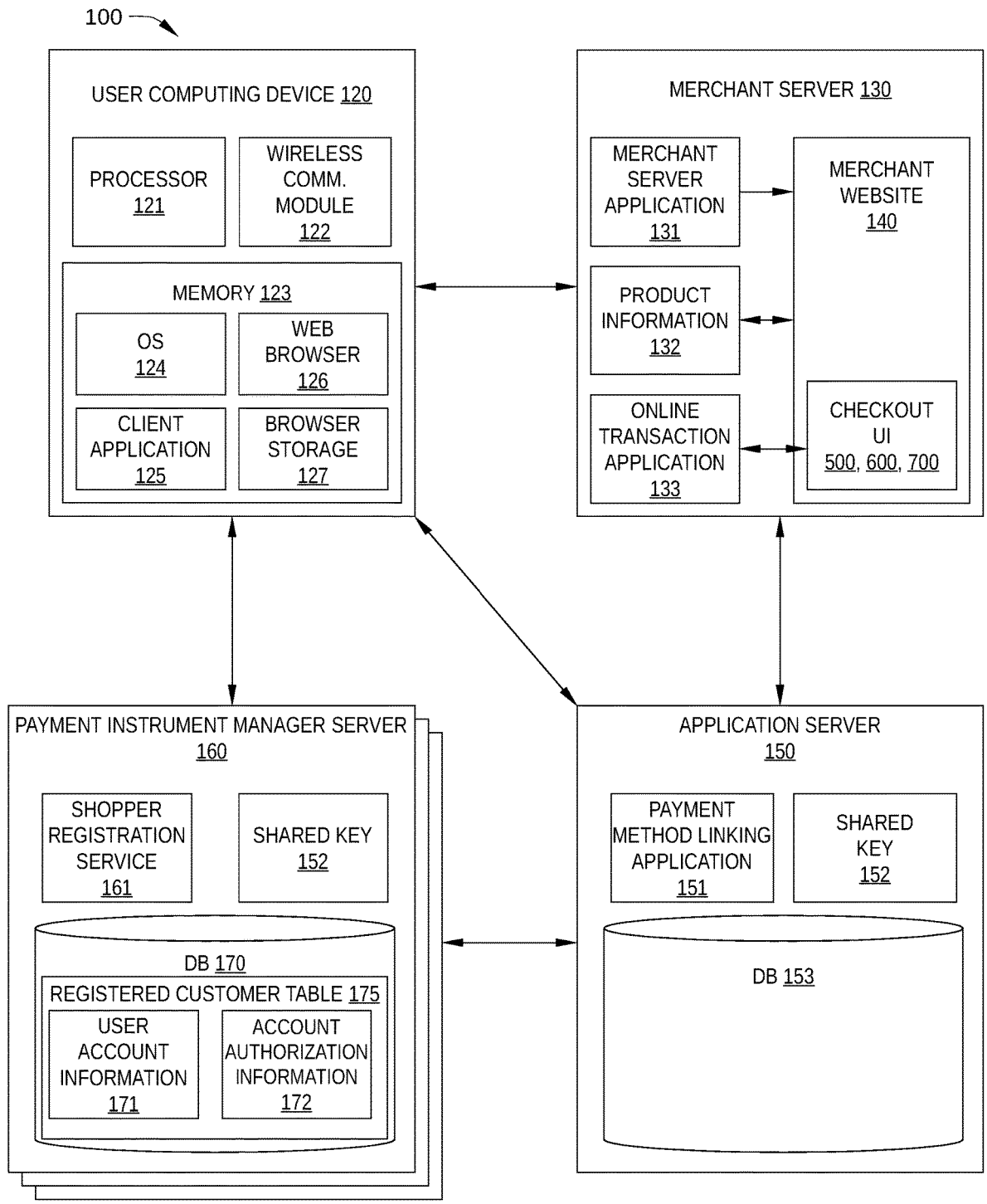
FIG. 1 is a block diagram of an online transaction network, according to one or more embodiments of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the figures, can be arranged, substituted, combined, and designed in a wide variety of different configurations, all of which are explicitly contemplated and make part of this disclosure.

FIG. 1 is a block diagram of an online transaction network 100, according to one or more embodiments of the present invention. As described below, online transaction network 100 enables a purchasing method to be selected and used to complete an online purchase on a merchant website 140 from a user computing device 120. More specifically, the purchasing method is selected and the online purchase completed via user computing device 120 without manual entry of shipping information and/or credit card information.

Online transaction network 100 includes user computing device 120, merchant server 130, an application server 150, and one or more payment instrument manager servers 160. User computing device 120, merchant server 130, application server 150, and/or payment instrument manager server 160 are communicatively coupled by one or more communication networks (not shown). The one or more communication networks can each include a wireless local area network (WLAN), a cellular network, a wired communication network (such as a local area network), the Internet, or any combination thereof.

In some embodiments, a WLAN included in the communication networks enables compatible devices to connect to the Internet, either via a wired connection or a wireless access point, or "hotspot." For example, in some embodiments, the WLAN is a WiFi network that includes one or more devices based on the Institute of Electrical and Electronics Engineers (IEEE) 802.11 standard. Thus, in such embodiments, any suitably configured wireless communication device that can connect to the WLAN, such as a smartphone or electronic tablet with WiFi capability, can perform data transfer to and from the Internet. Similarly, a cellular network included in the communication networks enables two-way wireless communication with wireless subscriber terminals, such as user computing device 120 when user computing device 120 is configured as a smartphone.

User computing device 120 can be any technically feasible and network-connected computing device. For example, user computing device 120 can be a desktop computer, laptop computer, smartphone, personal digital assistant (PDA), tablet computer, or any other type of computing device that is configured to receive input, process data, and display images, and is suitable for practicing one or more embodiments of the present invention. Thus, user computing device 120 is configured to execute a client application 125, an operating system 124, a web browser 126, and/or other software applications. In addition, user computing device 120 is configured to communicate with merchant server 130 and/or application server 150, for example via a web browser 126.

To that end, in some embodiments, user computing device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with a communication network. Thus, in some embodiments, wireless communication module 122 includes cellular capability and WiFi capability, among others. Alternatively or additionally, in some embodiments, wireless communication module 122 includes Bluetooth capability. Alternatively or additionally, in some embodiments, user computing device 120 includes a network interface controller or other computer hardware component that connects user computing device 120 to communication network 108. Memory 123 can include any suitable volatile and/or nonvolatile memory (e.g., random-access memory (RAM), read-only memory (ROM), flash memory, a magnetic hard drive, etc.), and is configured to store instructions, data, a client application 125, an operating system (OS) 124, and/or web browser 126, etc. In some embodiments, memory 123 includes browser storage 127.

Client application 125 is a computer program designed to run on user computing device 120. Client application 125 is loaded on user computing device 120 and enables interactions with application server 150, according to embodiments described herein. OS 124 supports the functions of processor 121, including scheduling tasks and sending commands to client application 125, memory 123, and wireless communication module 122, managing the power state of user computing device 120, initiating execution of applications on processor 121, managing sockets and TCP connections, and the like. For example, in some embodiments, OS 124 is configured to facilitate the execution of web browser 126, and/or other software applications.

Merchant server 130 is configured to enable online transactions with a particular online merchant. Generally, merchant server 130 can be any entity that is separate from and can be accessed by client device 120 via a communication network, such as via web browser 126. Merchant server 130 can be implemented as a computing device, an application running on an instance of virtual machine, and the like. For example, merchant server 130 can be a host computing device or web host service configured to provide access to and/or generate a merchant website 140. Thus, in some embodiments, merchant server 130 includes and/or executes a merchant server application 131 that generates merchant website 140. In some embodiments, merchant server further includes product information 132. Merchant server 130 further includes an online transaction application 133 configured to perform various operations described herein, such as extracting an unencrypted shopper identifier credential from a checkout user interface (UI) and populating the checkout UI with selection fields for one or more payment methods.

Merchant website 140 enables the display and sale of products and/or services to online shoppers. For example, in some embodiments, user computing device 120 is connected to merchant website 140 via web browser 126 in the course of online shopping. In such embodiments, a user can browse through various pages of merchant website 140 that display product information 132, select a particular product or service, and then purchase the particular product or service via an online transaction.

Application server 150 is configured to implement certain encryption and other operations to enable various embodiments described herein. Such operations include generation of an encrypted shopper identifier credential (SIC), sending queries to payment instrument managers to determine whether the encrypted SIC is linked to an account at the payment instrument manager, and causing a checkout UI displayed on a user computing device to be modified with a selection field for each account determined to be inked to the encrypted SIC. Generally, application server 150 can be any entity that is separate from and can be accessed by user computing device 120 via the communication networks associated with online transaction network 100. Thus, in some embodiments, application server 150 can be implemented as a computing device, an application running on an instance of virtual machine, and the like. In some embodiments, an account associated with an encrypted SIC at the payment instrument manager includes a set of data elements grouped under a unique identifier for the purposes of communication within internal systems and/or across external networks.

Application server 150 includes one or more of an online transaction application 151, a shared key 152, and, in some embodiments, a database 153. Online transaction application 151 is configured to perform the various operations associated with application server 150 as described herein.

Payment instrument manager server 160 is configured to implement certain encryption and other operations associated with a payment instrument manager (PIM). As defined herein, a payment instrument manager can be an issuing bank or other card issuer, a mobile payment service, a digital wallet service, or any other entity that stores payment instrument data of individual users or shoppers, such as a token vault. Further, in some embodiments, a PIM can include multiple separate entities (not shown). For example, in one such embodiments, a PIM associated with PIM server 160 can be an online payments system that supports online money transfers and includes or interacts with a token vault or other external service, where the token vault/external service stores or can access the payment instrument data of individual shoppers. In such embodiments, the online payments system further includes a customer-facing service, such as a payment service that has individual shopper or other user accounts. Thus, in such embodiments, a shopper or other user can interact with and have an account with the customer-facing payment service of the PIM without interacting directly with the token vault or other storage entity associated with the PIM. In such embodiments, payment instrument data of an individual shopper that has an account with the PIM is stored by or accessed by the PIM via the token vault or external service.

Payment instrument data can include any set of data associated with a particular shopper, individual, business, or other user that is sufficient to complete a purchase, such as an online purchase, an electronic transfer of funds, or other electronically performed financial transaction. In some embodiments, payment instrument data stored by or accessible to a PIM include multiple fields of data that, in combination, enable a credit card-based purchase to be completed by a payment processor. For example, in such embodiments, such payment instrument data can include a primary account number (PAN) and a card verification value (CVV) associated with a specific credit card account. In such embodiments, such payment instrument data may further include personal identifiable information (PII) associated with a specific credit card account, such as a user name, address, and/or phone number. In another example, in such embodiments, such payment instrument data includes a bank routing number and a user account number that are both associated with a specific shopper or other user. In some embodiments, payment instrument data stored by or accessible to a PIM include a card token associated with a specific credit card account, a one-time-use credit card number, or a virtual PAN. In some embodiments, some or all portions of payment instrument data associated with a specific PIM server 160 can be encrypted, and in other embodiments some or all portions of payment instrument data associated with a specific PIM server 160 can be unencrypted. In some embodiments, payment instrument data includes account information 171 and/or account authorization information 172, which are described below.

Generally, PIM server 160 can be any entity that is separate from and can be accessed by application server 150 via the communication networks associated with online transaction network 100. Thus, in some embodiments, PIM server 160 can be implemented as a computing device, an application running on an instance of virtual machine, and the like. PIM server 160 includes a shopper registration service 161 that is configured to perform various operations associated with embodiments described herein. In some embodiments, PIM server 160 further includes shared key 152 and a database 170. Database 170 includes a registered customer table 175, user account information 171, and account authorization information 172. In some embodiments, account information 171 and/or account authorization information 172 are employed as payment instrument data in online transaction network 100.

Figure 2:
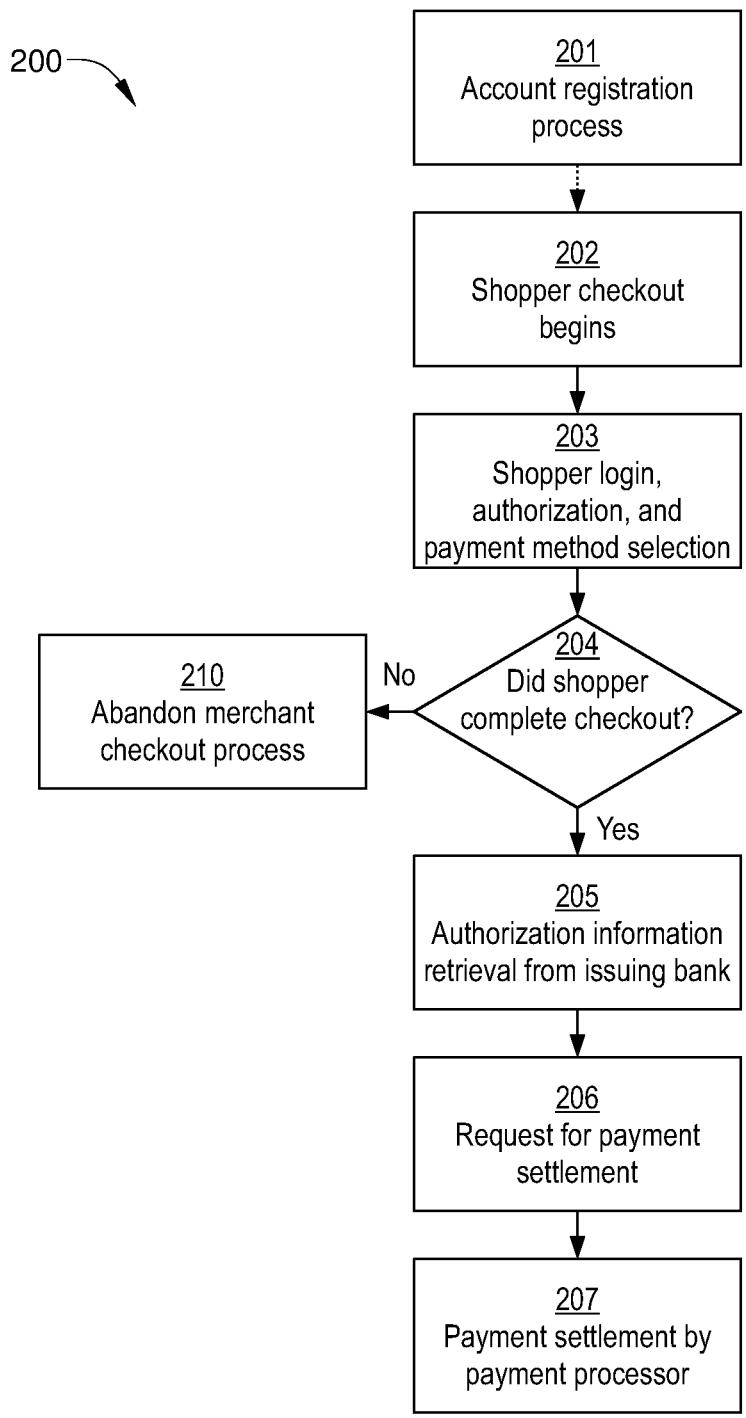
FIG. 2 is a flowchart illustrating the steps of an online transaction, according to various embodiments.

FIG. 2 is a flowchart illustrating the steps of an online transaction 200, according to various embodiments. In online transaction process 200, an online shopper (not shown) performs an online transaction at a merchant website (e.g., merchant website 140 of FIG. 1). For example, the online transaction can be an online purchase of a good or service via the merchant website. Prior to the online transaction, the online shopper registers an account that is associated with a PIM (e.g., PIM server 160 of FIG. 1). According to various embodiments, the online shopper completes the online transaction using the registered account as a payment method, where the payment method is selected, authorized, and confirmed as part of the merchant website checkout process, for example via a selection field of a checkout UI of the merchant website.

Online transaction 200 may include one or more operations, functions, or actions as illustrated by one or more of blocks 201-210. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure any suitably configured system can perform online transaction 200.

Online transaction 200 begins at step 201, in which the online shopper performs an account creation process. In the process, the online shopper establishes an account at a PIM, and the account includes a SIC and authentication-enabling information with the PIM. In some embodiments, the authentication-enabling information enables the PIM to send a one-time password (OTP) to a trusted device associated with the online shopper (e.g., user computing device 120). In some embodiments, the authentication-enabling information includes identifying information that can be used to confirm the identity of a specific online shopper, such as an email address associated with the specific online shopper, a phone number of the specific online shopper, biometric information associated with the specific online user, and/or the like. An example embodiment of the account creation process performed in step 201 may include a registered user of an issuing bank having their SIC and authentication-enabling information being made available for this process. An additional example of an account creation process may include a shopper transacting on a merchant website and having their SIC and authentication-enabling information stored with a third-party vault through payment processing. This shopper might not yet have a direct relationship with the vault, though that vault may then choose to participate as a PIM and provide the shopper access to this method. One example of the account creation process is described in greater detail below in conjunction with FIG. 3. In some embodiments, the trusted device is a computing device that is associated with the online shopper and is registered with the PIM in step 201 or at another time.

In step 202, the online shopper initiates an online transaction via a user computing device (e.g., user computing device 120 in FIG. 1). For example, in some embodiments, the online user connects to merchant website 140, selects one or more goods and/or services for purchase, and begins the checkout process for merchant website 140. For example, the online shopper can begin the checkout process by clicking on, tapping, or otherwise selecting a "checkout" selection field displayed on a page of merchant website 140, such as a cart page or a main page of merchant website 140.

In step 203, the online shopper completes the checkout process by performing login, payment method selection, and authorization from a checkout UI of merchant website 140. More specifically, the online shopper logs in to a payment method linking service (e.g., payment method linking application 151) via merchant website 140, selects a payment method (one or more of which are added to the checkout UI in response to the online shopper logging in) via merchant website 140, and authorizes the transaction by entering an OTP via merchant website 140. The OTP is sent to the trusted device registered with the PIM in step 201, and entry of the correct OTP value via an authorization UI of merchant website 140 authorizes the payment method selected by the online shopper. An example embodiment of a checkout process performed in step 203 is described in greater detail below in conjunction with FIGS. 4 and 8.

In step 204, online transaction network 100 (e.g., payment method linking application 151) determines whether the online shopper has completed the checkout process, for example by selecting a suitable payment method for the online transaction and by clicking on, tapping, or otherwise selecting a "complete purchase" selection field displayed on a page of merchant website 140. When the online shopper fails to complete the checkout process, online transaction process 200 proceeds to step 210 and the merchant checkout process is abandoned. When online transaction network 100 determines the online shopper has completed checkout, online transaction process 200 proceeds to step 205.

In step 205, online transaction network 100 (e.g., payment method linking application 151) requests and receives account authorization information 172 from the PIM associated with the payment method selected in step 203. For example, the authorization information may include sensitive credit card information associated with the payment method selected in step 203 and associated with the online shopper, such as a PAN and/or a CVV, a card token, or any other payment instrument data.

In step 206, online transaction network 100 (e.g., payment method linking application 151) generates a request for payment settlement associated with the online transaction. The request for payment settlement generally includes the authorization information received from the PIM in step 205. Typically, the payment settlement includes the transfer of funds from the account associated with the payment method selected in step 203 to a bank account associated with the merchant. In some embodiments, online transaction network 100 transmits the request to a payment processor with which the merchant has registered.

In step 207, the payment processor completes the online transaction by performing the requested payment settlement, and funds associated with the online transaction are transferred from an account at an issuing bank associated with the PIM selected in step 203 to a bank account associated with the merchant.

Alternatively, in some embodiments, online transaction network 100 processes the transaction. In such embodiments, steps 206 and 207 are performed by online transaction network 100 upon receipt of payment settlement information (such as confirmation a particular credit card has not exceeded an associated limit). In such embodiments, online transaction network 100 integrates with a payment service provider. Alternatively, in some embodiments, online transaction network 100 transmits account authorization information 172 to merchant server 130, which integrates with a payment service provider. Alternatively, in some embodiments, online transaction network 100 transmits account authorization information 172 to a third party, such as a digital wallet server or other service provider.

It is noted that online transaction process 200 is a low-friction, fast, and secure process, in which the online shopper enters no sensitive credit card or other payment method information into a checkout UI of a merchant website, such as a PAN or CVV.

Figure 3:
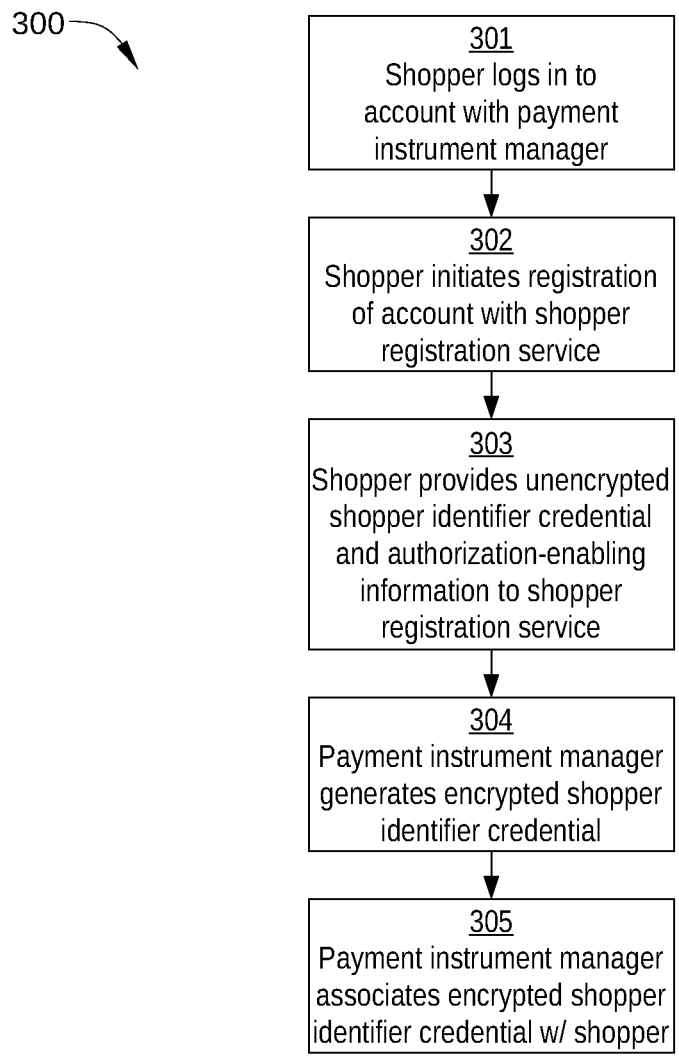
FIG. 3 is a flowchart illustrating the steps of a shopper registration process, according to various embodiments.

FIG. 3 is a flowchart illustrating the steps of an example shopper registration process 300 which may be performed in step 201 of FIG. 2, according to various embodiments. In online transaction process 300, an online shopper (not shown) registers an account that is associated with a PIM (e.g., PIM server 160 of FIG. 1) to facilitate subsequently performed online transactions at one or more merchant websites (e.g., merchant website 140 of FIG. 1). Specifically, the account registered in shopper registration process 300 can be employed as a payment method at a merchant website by the online shopper without the online shopper registering in any way with merchant website 140 or by inputting sensitive credit card information into merchant website 140.

Shopper registration process 300 may include one or more operations, functions, or actions as illustrated by one or more of blocks 301-305. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure any suitably configured system can perform shopper registration process 300.

Shopper registration process 300 begins at step 301, in which the online shopper logs in to an account with a PIM. Thus, in step 301, the online shopper acts as a user of a PIM who is associated with a specific account of that PIM. Generally, the account can be any account at any suitable PIM, such as a card issuer or issuing bank, mobile payment service, digital wallet service, token vault, bank, or any other entity that stores payment instrument data of individual users or shoppers. In step 302, the online shopper initiates registration of the account with a shopper registration service associated with the PIM (e.g., shopper registration service 161 of FIG. 1).

In step 303, the online shopper provides an unencrypted SIC and associated authorization-enabling information to the shopper registration service at the PIM. In some embodiments, the unencrypted SIC can be any alphanumeric string suitable for identifying the online shopper, such as a user name for the online shopper, an email address associated with the online shopper, and/or the like. In such embodiments, the online shopper can manually enter the unencrypted SIC via user computing device 120.

In some embodiments, the encrypted SIC can be based on a value included in a first-party cookie that is stored on user computing device 120. In such embodiments, the online shopper does not manually enter the unencrypted SIC. For example, in some embodiments, the first-party cookie can be stored in browser storage 127 by client application 125 or by payment method linking application 151 prior to shopper registration process 300. In such embodiments, the value can be detected in step 303 by shopper registration service 161 or some other entity associated with the PIM. In such embodiments, the value can be a unique identifier included in the first-party cookie, such as a value assigned to the particular online shopper, a value based on a user name associated with the particular online shopper, a value based on an email address associated with the particular online shopper, a randomly determined value, and/or the like. In some embodiments, the value is determined for a particular online shopper when that particular online shopper registers with payment method linking application 151 and/or when that particular online shopper loads client application 125 onto user computing device 125.

The authorization-enabling information includes information that enables sending of an OTP to the online shopper during a merchant checkout process. For example, in some embodiments, the authorization-enabling information includes an email address associated with the online shopper or a phone number associated with the online shopper. Thus, in such embodiments, an OTP or other trusted message can be sent via text or voice message to the phone number or email address, thereby enabling secure authorization of an online transaction by the online shopper without entering sensitive credit card information during the online transaction at merchant website 140.

In step 304, the PIM (e.g., via shopper registration service 161) generates an encrypted SIC based on the unencrypted SIC provided in step 303. For example, in some embodiments, shopper registration service 161 generates the encrypted SIC by "hashing" (employing a cryptographic hash function) the unencrypted SIC with shared key 152 (shown in FIG. 1). As described below, shared key 152 is also available to payment method linking application 151. Thus, payment method linking application 151 can also generate the encrypted SIC associated with a particular online shopper based on the unencrypted SIC associated with the particular online shopper.

In step 305, the PIM (e.g., via shopper registration service 161) associates the encrypted SIC with the online shopper who logged in to a particular account at the PIM in step 301. For example, in some embodiments, shopper registration service 161 stores the encrypted SIC in database 170 as part of registered customer table 175 and associates the encrypted SIC with user account information 171 and account authorization data 172 for that particular account. Upon completion of shopper registration process 300, user account information 171 and user authorization data 172 for that particular account can be accessed indirectly with the encrypted SIC for that online shopper. Because each entry of registered customer table 175 is based on an encrypted SIC, registered customer table 175 is an anonymized table of user account information 171 and account authorization data 172.

In the embodiment of shopper registration process 300 described above, an online shopper with an account that is associated with a PIM manually initiates the shopper registration process for the account, and inputs unencrypted SIC and appropriate authorization-enabling information as part of the shopper registration process. In other embodiments, a shopper registration process can be initiated automatically, for example at the time of checkout at merchant website 140. In such embodiments, online transaction application 133 (and/or client application 125) can query whether the online shopper would like to register (e.g., via a dialog box or other interactive UI element). In such embodiments, the online shopper can then enter an unencrypted SIC and appropriate authorization-enabling information. It is noted that in such embodiments, the online shopper still does not enter sensitive credit card, billing, or personal identifiable information (PII) to complete the registration process.

Figure 4:
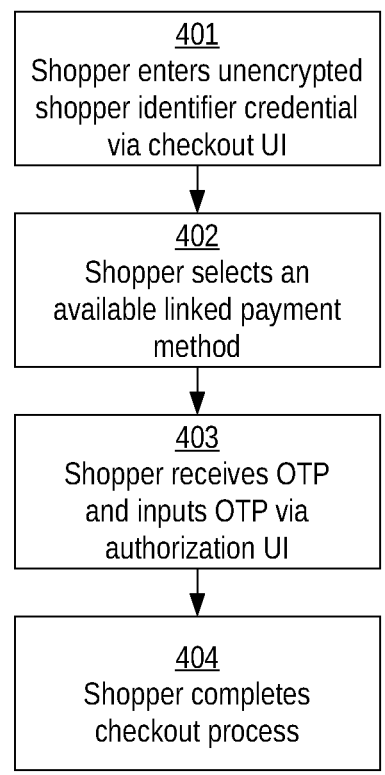
FIG. 4 is a flowchart illustrating the steps performed by an online shopper during an online transaction, according to various embodiments.

FIG. 4 is a flowchart illustrating the steps 400 performed by an online shopper during an online transaction, according to various embodiments. Specifically, steps 400 are performed once a checkout process begins. For example, in some embodiments, steps 400 are performed by the online shopper during step 203 of online transaction 200 in FIG. 2. Steps 400 may include one or more operations, functions, or actions as illustrated by one or more of blocks 401-404. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure an online shopper can perform steps 400 in conjunction with any suitably configured system.

In step 401, the online shopper enters an unencrypted SIC via a checkout UI of merchant website 140. One embodiment of a checkout UI of merchant website 140 is described below in conjunction with FIG. 5.

Figure 5:
FIG. 5 illustrates a checkout user interface (UI) of a merchant website, according to an embodiment.

FIG. 5 illustrates a checkout UI 500 of merchant website 140, according to an embodiment. Checkout UI 500 can be associated with a specific web page of merchant website 140, such as a checkout page, and enables an online shopper to complete an online transaction on merchant website 140. In some embodiments, user computing device 120 displays checkout UI 500 when an online user clicks on, taps, or otherwise selects a "checkout" selection field displayed on a page of merchant website 140. As shown, in the embodiment illustrated in FIG. 5, checkout UI 500 includes an order summary region 510 and an order completion region 520.

Generally, order summary region 510 includes information that enables an online shopper to verify that the correct good(s) and/or service(s) are included in the order being completed via checkout UI 500, such as a product image, a selected product size, a selected product color, a selected product name, a product price, a total order price, and/or the like.

Order completion region 520 may include one or more entry fields for the entry of information and/or one or more selection fields. Generally, the entry fields of order completion region 520 include one or more contact information fields 521 for the entry of contact information (e.g., email address and/or phone number), one or more shipping information fields 522 for the entry of shipping information (e.g., name, address, apartment/suite number, city, state, ZIP code, phone number, etc.), and one or more payment information fields (not shown) for the entry of payment information (e.g., PAN for the credit card used to complete the online transaction, CVV of the credit card used to complete the online transaction, billing address associated with the credit card used to complete the online transaction, phone number associated with the credit card used to complete the online transaction, etc.). It is noted that in a conventional checkout process, manual entry of information into most or all of contact information fields 521, shipping information fields 522, and/or payment information fields is required, unless the online shopper has registered in some way previously with merchant website 140. As noted above, manual form completion is subject to human error, is generally time-consuming for the online shopper, and adds significant friction to the online shopping process.

Generally, the selection fields of order completion region 520 include one or more buttons, selectable icons, and the like that can be selected with a mouse click, finger tap, and/or the like. In the embodiment illustrated in FIG. 5, order completion region 520 includes a login button 525 and an express checkout button 526, each of which is intended to facilitate the completion of the current online transaction by reducing or eliminating the need for manual entry of shipping and/or payment information. However, login button 525 and express checkout button 526 each have certain drawbacks. Login button 525 enables the online shopper to avoid manual entry of shipping and/or payment information by using previously entered information associated with a previously established account with merchant website 140. Thus, for first-time visitors to merchant website 140, and for online shoppers who prefer to avoid entering sensitive payment information into merchant website 140, login button 525 has little or no utility. Similarly, express checkout button 526 can circumvent the need for an online shopper to manually enter shipping and/or payment information into merchant website 140. However, express checkout button 526 is configured to direct the online shopper to a mobile payment service or digital wallet service, which requires redirecting web browser 126 to the website of the mobile payment service or digital wallet service and adds friction to the online transaction process. In addition, implementation of each express checkout button 526 as part of checkout UI 500 requires significant engineering effort, which can be problematic for smaller merchants. Further, once implemented as part of checkout UI 500, express checkout button 526 is displayed during checkout regardless of whether the current online shopper has an account with the mobile payment service or digital wallet service associated with express checkout button 526, which can lead to confusion on the part of the online shopper and/or distract from completion of the current online transaction.

Returning to FIG. 4, as noted above, in step 401, the online shopper enters an unencrypted SIC via checkout UI 500. For example, in some embodiments, the online shopper enters an email address into a suitable contact information field 521 in order completion region 520 of checkout UI 500. In some embodiments, in response to the entry of an unencrypted SIC that is associated with an account at one or more PIMs, checkout UI 500 is modified to include one or more selection fields that each correspond to an available payment method for the online user. One embodiment of a checkout UI that is modified with such selection fields is described below in conjunction with FIG. 6.

Figure 6:
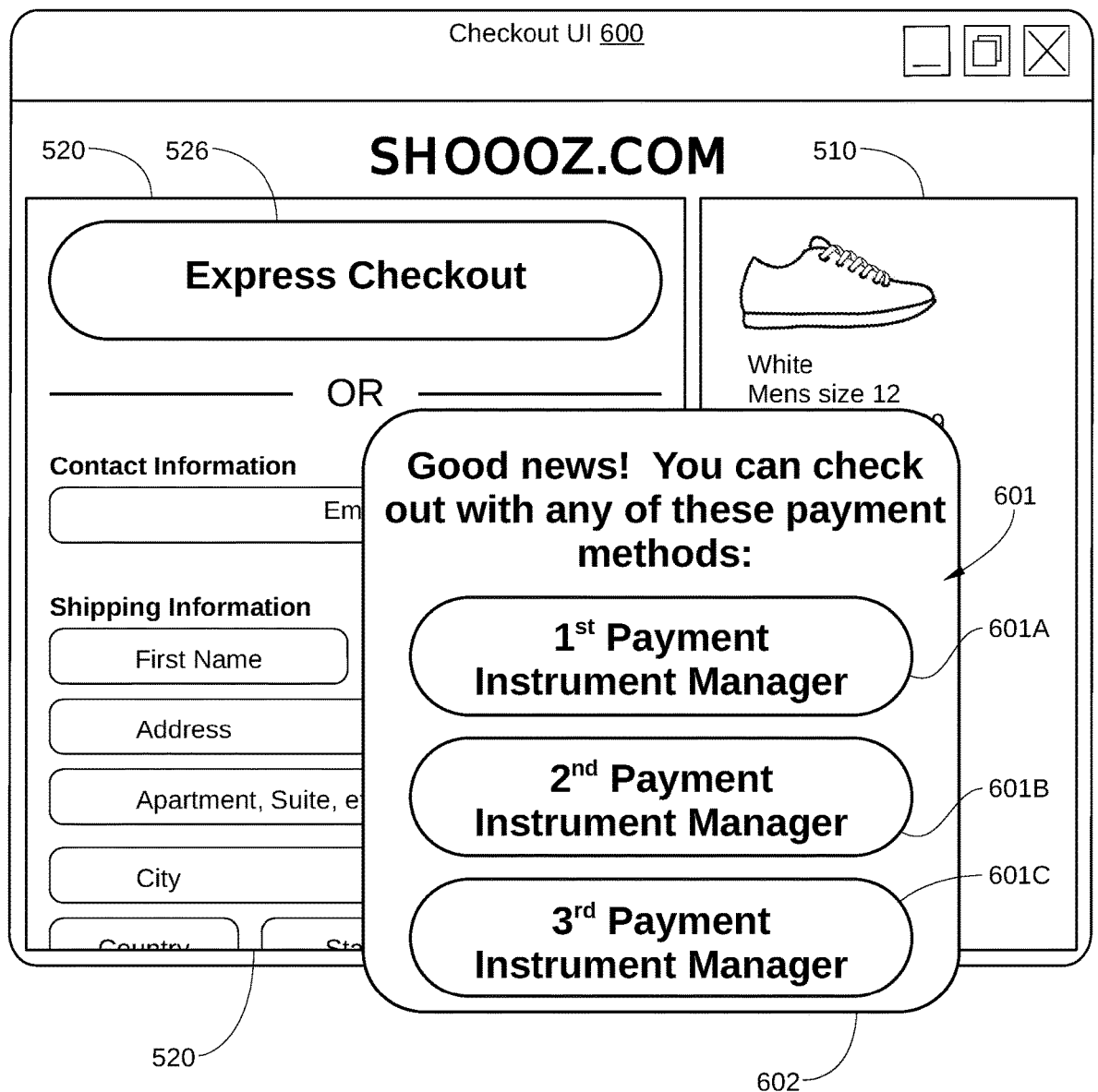
FIG. 6 is a checkout UI of a merchant website that is modified with selection fields that correspond to linked payment methods, according to an embodiment.

FIG. 6 is a checkout UI 600 of merchant website 140 that is modified with selection fields that correspond to linked payment methods, according to an embodiment. Checkout UI 600 is substantially similar to checkout UI 500 of FIG. 5, except for being modified with one or more selection fields 601A-601C (referred to collectively herein as "selection fields 601"). Each of selection fields 601 can be a selectable button, icon, or other UI element associated with a different linked payment method, which is a payment method that has been set up via a shopper registration process similar to shopper registration process 300. Thus, selection field 601A enables selection of an account with a first PIM as a payment method for the current online transaction, where the account with the first PIM is associated with the encrypted SIC for the online shopper; selection field 601B enables selection of an account with a second PIM as a payment method for the current online transaction, where the account with the second PIM is also associated with the encrypted SIC for the online shopper; and selection field 601C enables selection of an account with a third PIM as a payment method for the current online transaction, where the account with the third PIM is also associated with the encrypted SIC for the online shopper.

In the embodiment illustrated in FIG. 6, selection fields 601 are displayed within a window 602 that is superimposed on order summary region 510 and/or order completion region 520 of checkout UI 600. In other embodiments, selection fields 601 are displayed within order summary region 510 and/or order completion region 520 of checkout UI 600. Alternatively or additionally, in some embodiments, selection fields 601 are displayed via a dialog box or any other interactive UI element.

Returning to FIG. 4, in step 402, the online shopper selects an available linked payment method for the current online transaction by mouse clicking, finger tapping, or otherwise selecting a particular selection field 601 of checkout UI 600 in FIG. 6. In some embodiments, in response to the selection of a particular selection field 601, checkout UI 600 is modified to include an authorization UI that enables the online shopper to enter an OTP. The OTP is entered as an authorization for the payment method associated with the particular selection field 601 in step 402. One embodiment of a checkout UI that is modified with an authorization UI is described below in conjunction with FIG. 7.

Figure 7:
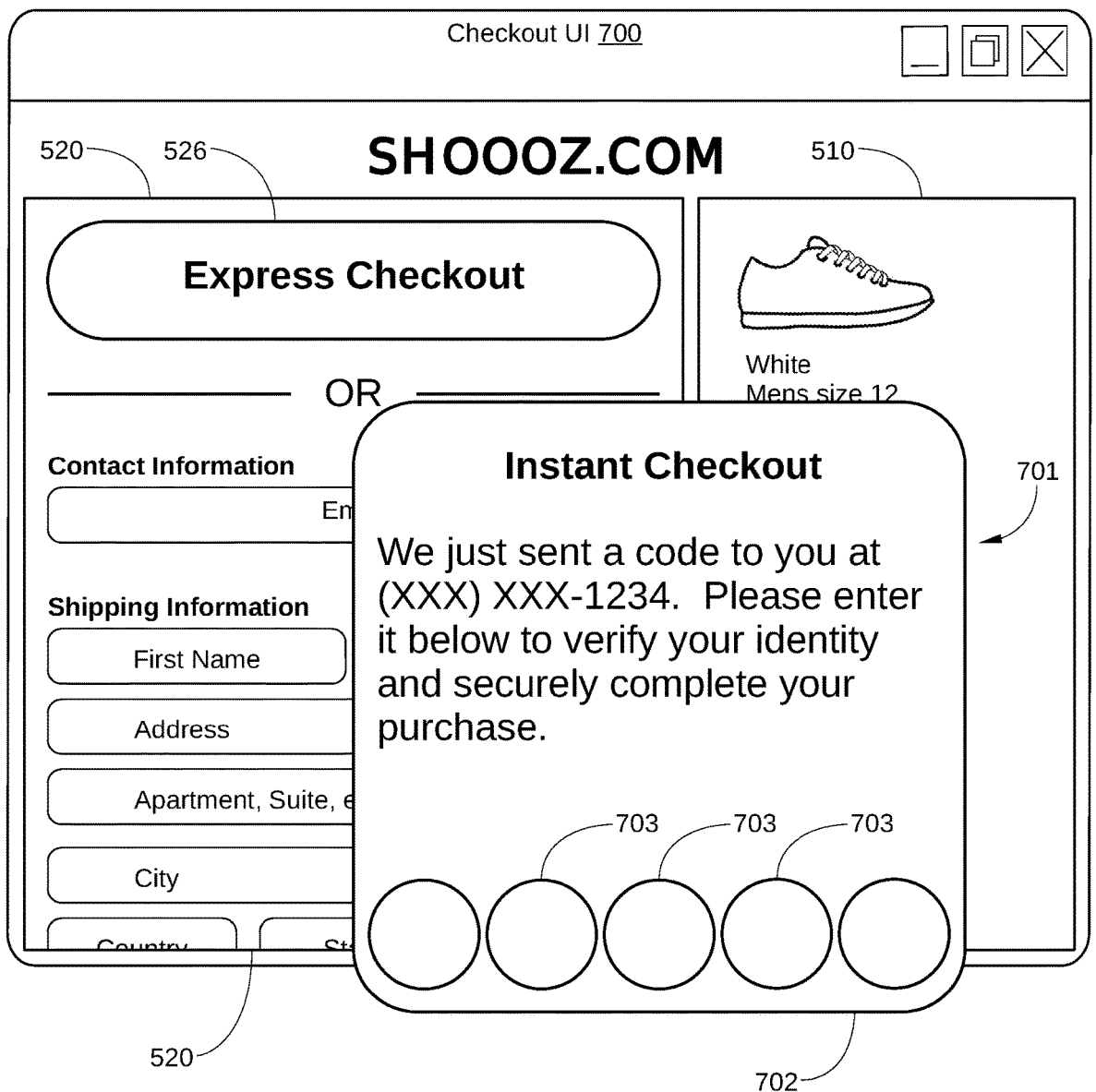
FIG. 7 is a checkout UI of a merchant website that is modified with an authorization UI, according to an embodiment.

FIG. 7 is a checkout UI 700 of merchant website 140 that is modified with an authorization UI 701, according to an embodiment. Checkout UI 700 is substantially similar to checkout UI 600 of FIG. 6, except for being modified with authorization UI 701. Authorization UI 701 enables entry of an OTP by an online shopper, for example via manual entry of the OTP into entry fields 703 of authorization UI 701. In the embodiment illustrated in FIG. 7, authorization UI 701 is displayed within a window 702 that is superimposed on order summary region 510 and/or order completion region 520 of checkout UI 700. In other embodiments, authorization UI 701 is displayed within order summary region 510 and/or order completion region 520 of checkout UI 700.

Returning to FIG. 4, in step 403, the online shopper receives an OTP for the linked payment method selected in step 402 and inputs the OTP via authorization UI 701. The online shopper receives the OTP via the trusted device associated with the online shopper (e.g., user computing device 120). In some embodiments, in response to the inputting of the correct OTP via authorization UI 701, the payment method is authorized, and checkout UI 700 is modified to indicate that the checkout process can be completed. For example, in some embodiments, a "purchase complete" message is displayed to the online shopper that includes order, shipping, and/or payment details associated with the online transaction. Alternatively, in some embodiments, a "confirm purchase" message is displayed that includes a "confirm purchase" button. In such embodiments, the checkout process is completed once the online shopper selects the confirm purchase button.

It is noted that the above-described steps 400 performed by the online shopper to complete an online transaction is highly streamlined. For example, in some embodiments, once a checkout button has been selected by the online shopper, the entries required to complete the purchase can be limited to: entering an unencrypted SIC, selecting a linked payment method that is shown to be available to the online user, and entering an OTP. The operations of online transaction network 100 that enable steps 400 are described below in conjunction with FIG. 8.

Figure 8:
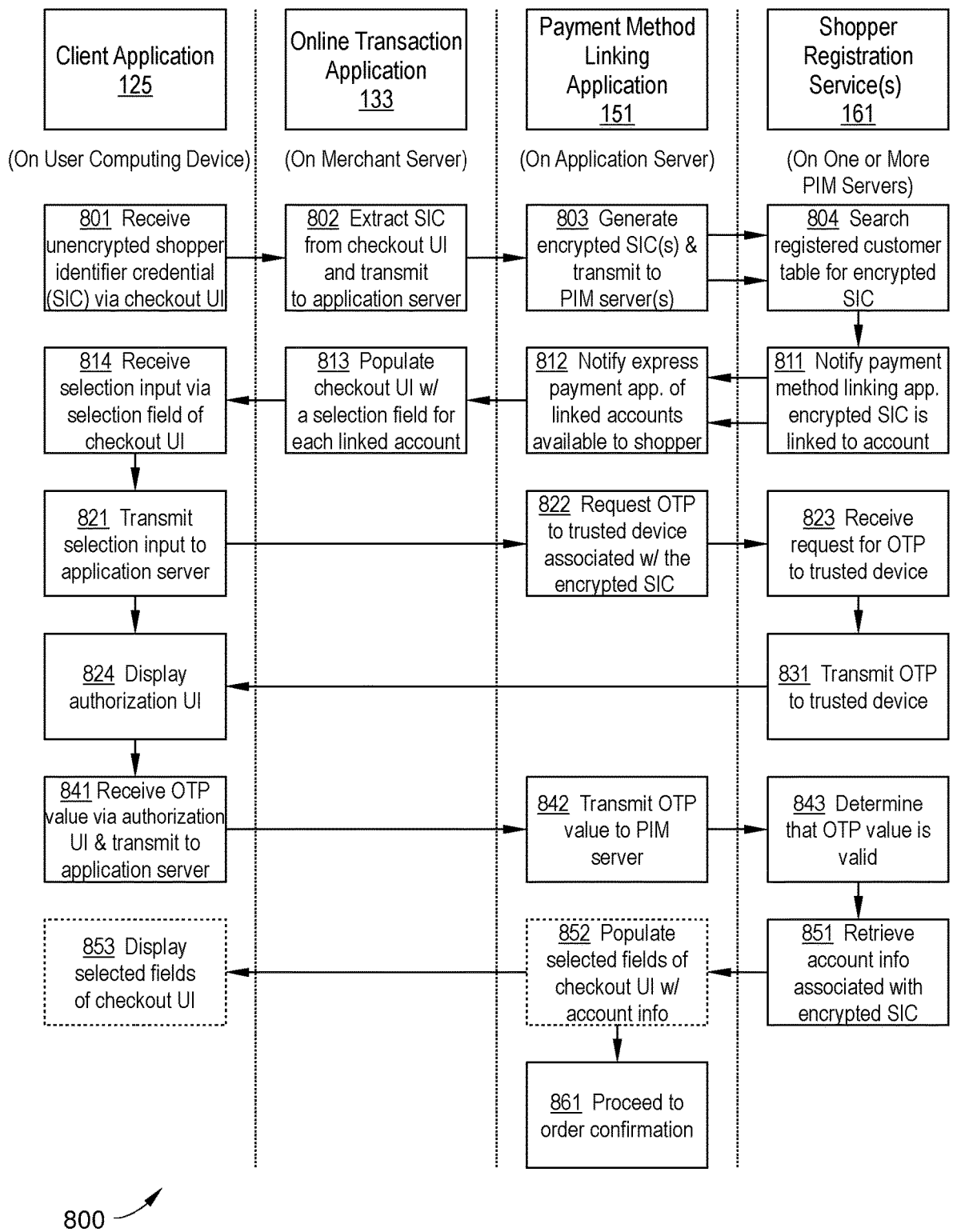
FIG. 8 is an operational diagram illustrating certain steps of an online transaction performed within the online transaction network of FIG. 1, according to various embodiments.

FIG. 8 is an operational diagram illustrating certain steps of an online transaction 800 performed within online transaction network 100, according to various embodiments. Specifically, online transaction 800 is performed once a checkout process begins. For example, in some embodiments, online transaction 800 is performed by online transaction network 100 during step 203 of online transaction 200 in FIG. 2. Online transaction 800 may include one or more operations, functions, or actions as illustrated by one or more of blocks 801-861. Although the blocks are illustrated in a specific order, these blocks may be performed in parallel, and/or in a different order than those described herein. Also, the various blocks may be combined into fewer blocks, divided into additional blocks, and/or eliminated based upon a specific implementation. Although the method is described in conjunction with online transaction network 100 of FIG. 1, persons skilled in the art will understand that within the scope of the present disclosure an online shopper can perform online transaction 800 in conjunction with any suitably configured system.

Online transaction 800 begins at step 801, where client application 125 or web browser 126 receives an unencrypted SIC via checkout UI 500, such as when an online shopper enters the unencrypted SIC into a suitable contact information field 521 of checkout UI 500. In some embodiments, a browser extension included in web browser 126 enables an event listener to be attached to the contact information field 521 and detect the unencrypted SIC.

In step 802, online transaction application 133 extracts the unencrypted SIC from checkout UI 500 and transmits the unencrypted SIC to payment method linking application 151. Alternatively, in some embodiments, online transaction application 133 is configured with an event listener that transmits entries from the contact information field 521 to payment method linking application 133. In some alternative embodiments, online transaction application 133 extracts the unencrypted SIC from a first-party cookie stored in browser storage 127 of user computing device 120. In such embodiments, the unencrypted SIC can be based on a value included in the first-party cookie. Thus, in such embodiments, the online shopper does not manually enter the unencrypted SIC. In some alternative embodiments, online transaction application 133 generates the unencrypted SIC from a device ID or other unique identifier associated with user computing device 120. In such embodiments, the unencrypted SIC can be based on a value included in the device ID or other unique identifier. Thus, in such embodiments, the online shopper does not manually enter the unencrypted SIC.

In step 803, payment method linking application 151 receives the unencrypted SIC, either from online transaction application 133 or from user computing device 120 directly. Payment method linking application 151 then generates the encrypted SIC using shared key 152 that is employed by shopper registration service 161 in shopper registration process 300 of FIG. 3. Payment method linking application 151 then sends a query that includes the encrypted SIC to one or more PIM servers 160. Each query requests an indication from the receiving PIM whether the encrypted SIC is associated with an account for the receiving PIM.

In step 804, shopper registration service 161 receives the query and searches registered customer table 175 for the encrypted SIC. When the encrypted SIC is not found in registered customer table 175, shopper registration service 161 determines that there is no account associated with the online shopper at the PIM and an alternative checkout process must be used to complete the online transaction. In such an instance, online transaction terminates. Alternatively, when the encrypted SIC is found in registered customer table 175, shopper registration service 161 determines that there is an account associated with the online shopper at the PIM, and therefore the account is a linked payment method available to the online shopper.

In step 811, shopper registration service 161 notifies payment method linking application 151 that the encrypted SIC is linked to an account at that PIM, and therefore an account at that PIM is available to the online shopper as a payment method for the online transaction.

In step 812, payment method linking application 151 receives a response from each PIM at which an account is linked to the encrypted SIC. In some embodiments, payment method linking application 151 notifies online transaction application 133 of the PIMs or payment methods that are available to the online shopper associated with the encrypted SIC. Alternatively, in some embodiments, payment method linking application 151 directly notifies an extension included in web browser 126 of the PIMs or payment methods that are available to the online shopper associated with the encrypted SIC. In such embodiments, step 813 does not take place.

In step 813, online transaction application 133 populates or otherwise modifies checkout UI 500 with a selection field, such as a selection button 601, for each payment method available to the online shopper associated with the encrypted SIC.

In step 814, client application 125 or web browser 126 receives a selection input via one of the selection fields generated in step 813. For example, the selection input can be performed by the online shopper via checkout UI 600.

In step 821, client application 125 or web browser 126 transmits the selection input to payment method linking application 151. In step 822, payment method linking application 151 requests that the PIM associated with the selection input transmit an OTP to the online shopper. Specifically, the request is for the OTP to be transmitted to the trusted device associated with the account at the PIM that is associated with the selection input (e.g., user computing device 120). In step 823, the PIM (e.g., via shopper registration service 161) receives the request for an OTP to be transmitted to the trusted device associated with the selected payment method. In step 824, client application 125 or web browser 126 displays an authorization UI 701, so that the online shopper can enter the OTP.

In step 831, the PIM transmits the OTP to the trusted device, using the authorization-enabling information registered with the account at the PIM in shopper registration process 300. For example, in some embodiments, the OTP is sent via a short message service (SMS) message to a mobile phone number. In other embodiments, the OTP is sent via email to an email address included in the authorization-enabling information. In yet other embodiments, the OTP is sent via a sound recording to a phone number and/or an email address included in the authorization-enabling information.

In step 841, client application 125 or web browser 126 receives an OTP value via user inputs into authorization UI 701. Client application 125 or web browser 126 then transmits the input OTP value to payment method linking application 151. In step 842, payment method linking application 151 transmits the OTP value to shopper registration service 161. In step 843, shopper registration service 161 determines whether the OTP value is valid. If yes, online transaction 800 proceeds to step 851; if no, shopper registration service 161 notifies online transaction application 133 and/or client application 125 that an alternative checkout process must be used to complete the online transaction, and online transaction 800 terminates.

In some embodiments, operations attributed to the PIM in steps 822, 823, 831 and 843 are instead performed by payment method linking application 151. For example, in embodiments in which payment method linking application 151 operates as a trusted partner of the PIM, payment method linking application 151 generates the OTP and transmits the OTP to the trusted device, receives an OTP value from the user via user inputs into authorization UI 701, and determines whether the OTP value is valid and notifies the issuing bank accordingly.

In step 851, shopper registration service 161 retrieves account information for the account associated with the payment method selected in step 814, such as user account information 171 and/or account authorization information 172. Shopper registration service 161 then transmits user account information 171 to payment method linking application 151. In some embodiments, shopper registration service 161 also transmits account authorization information 172 to payment method linking application 151. In optional step 852, payment method linking application 151 populates certain selection fields of checkout UI 700, such as shipping information fields 522, to enable confirmation by the online shopper. In optional step 853, client application 125 or web browser 126 causes user computing device to display the selection fields of checkout UI 700.

In step 861, payment method linking application 151 performs order confirmation and completion, such as steps 204-206 in online transaction 200 of FIG. 2. For example, in some embodiments, the online shopper is given an opportunity to review and confirm the purchase before a request for payment settlement is made by payment method linking application 151. In another example, in some embodiments, online transaction network 100 requests and receives payment instrument data (e.g., account authorization information 172) from the PIM, then generates and transmits a request for payment settlement associated with the online transaction to a payment processor (e.g., a bank with which the merchant has registered). In such embodiments, the PIM can be the payment processor or a different entity than the payment processor, such as a payment service.

In the above-described embodiments, manual data entry into one or more pages of multi-field forms is not performed by an online shopper to complete an online transaction, such as credit card information, PII, other billing information, shipping information, and the like. In addition, in the embodiments, the online shopper is not directed to a payment facilitation tool or website for an abbreviated purchase confirmation process to be completed by the online shopper. Instead, the online shopper enters an unencrypted SIC, and is then presented with one or more available payment methods that are linked to that particular online shopper. The online transaction can then be completed by the online shopper via a single selection field, even when the online shopper has not visited the merchant website before and/or has not established any sort of account with that merchant website or provided any PII or credit card information to the merchant website. In light of the above, online transaction network 100 of FIG. 1 benefits consumers by simplifying the online purchase processes for consumers and reducing the normal level of friction in the online purchasing process. Further, the online merchant associated with the merchant website is not required to create a specialized application programming interface (API) for the merchant website for each payment method/PIM that can possibly be employed by online shoppers.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method of providing payment methods for an online transaction initiated via a user computing device, the method comprising:

receiving, by an application server, an unencrypted shopper identifier credential that is associated with a specific user and is input via a checkout user interface, wherein the checkout user interface is associated with the online transaction and is displayed at the user computing device and the unencrypted shopper identifier credential excludes sensitive information associated with the specific user;

in response to the application server receiving the unencrypted shopper identifier credential from the user computing device, generating, by the application server, a first encrypted shopper identifier credential and a second encrypted shopper identifier credential based on the unencrypted shopper identifier credential without the user computing device interacting with a first payment instrument manager, a second payment instrument manager, or a merchant;

sending, by the application server, a first query that includes the first encrypted shopper identifier credential to the first payment instrument manager and a second query that includes the second encrypted shopper identifier credential to the second payment instrument manager, wherein the first query requests a first indication that the first encrypted shopper identifier credential is associated with a first payment method available to the specific user via the first payment instrument manager and the second query requests a second indication that the second encrypted shopper identifier credential is associated with a second payment method is available to the specific user via the second payment instrument manager;

receiving, by the application server, a first response from the first payment instrument manager that includes the first indication and a second response from the second payment instrument manager that includes the second indication; and based on the first response, causing, by the application server, the checkout user interface to be modified with a first selection field, wherein the first selection field corresponds to the first payment method; and based on the second response, causing, by the application server, the checkout user interface to be modified with a second selection field, wherein the second selection field corresponds to the second payment method.

2. The computer-implemented method of claim 1, further comprising:

receiving a user input via the first selection field; and requesting that the first payment instrument manager transmit a one-time password to the user computing device.

3. The computer-implemented method of claim 2, wherein the first payment instrument manager transmits the one-time password to the user computing device based on authentication-enabling information that is associated with the first encrypted shopper identifier credential.

4. The computer-implemented method of claim 3, wherein the authentication-enabling information comprises at least one of an email address associated with the specific user, a phone number associated with the specific user, or biometric information associated with the specific user.

5. The computer-implemented method of claim 3, wherein, prior to the first query being sent to the first payment instrument manager, registering the authentication-enabling information with the first payment instrument manager.

6. The computer-implemented method of claim 1, further comprising:

receiving a first user input via the first selection field; and enabling display by the user computing device of an authorization user interface that is associated with the first payment instrument manager.

7. The computer-implemented method of claim 6, further comprising:
receiving a second user input via the authorization user interface that includes a one-time password; and
providing the one-time password to the first payment instrument manager.

8. The computer-implemented method of claim 7, further comprising, after providing the one-time password to the first payment instrument manager, receiving a set of user account information associated with the first encrypted shopper identifier credential from the first payment instrument manager.

9. The computer-implemented method of claim 8, further comprising, enabling the display of a first portion of the set of user account information on the user computing device, wherein the first portion includes shipping information associated with the first encrypted shopper identifier credential.

10. The computer-implemented method of claim 8, further comprising, providing a first portion of the set of user account information to a merchant associated with the online transaction, wherein the first portion includes shipping information associated with the first encrypted shopper identifier credential.

11. The computer-implemented method of claim 7, further comprising, after providing the one-time password to the first payment instrument manager, receiving payment instrument data associated with the first encrypted shopper identifier credential from the first payment instrument manager.

12. The computer-implemented method of claim 11, further comprising, sending a request for a payment settlement for the online transaction from a payment processor, wherein the request includes authorization information associated with the first encrypted shopper identifier credential.

13. The computer-implemented method of claim 1, wherein, for the first payment instrument manager, the first encrypted shopper identifier credential is associated with a set of user account information.

14. The computer-implemented method of claim 13, wherein the set of user account information includes at least one of shipping information associated with the specific user and billing information associated with the specific user.

15. The computer-implemented method of claim 1, wherein the sensitive information associated with the specific user includes one or more of credit card information, billing information, and personal identifiable information associated with the specific user.

16. A computer-implemented method of completing an online transaction initiated via a user computing device, the method comprising:
receiving, by an application server, an unencrypted shopper identifier credential that is associated with a specific user and is input via a checkout user interface, wherein the checkout user interface is associated with the online transaction and is displayed at the user computing device and the unencrypted shopper identifier credential excludes sensitive information associated with the specific user;
in response to the application server receiving the unencrypted shopper identifier credential from the user computing device, generating, by the application server, a first encrypted shopper identifier credential and a second encrypted shopper identifier credential based on the unencrypted shopper identifier credential without the user computing device interacting with a first payment instrument manager, a second payment instrument manager, or a merchant;
sending, by the application server, a first query that includes the first encrypted shopper identifier credential to the first payment instrument manager and a second query that includes the second encrypted shopper identifier credential to the second payment instrument manager; and
when the first encrypted shopper identifier credential is associated with a first account with the first payment instrument manager, receiving, by the application server, a first response from the first payment instrument manager that includes first payment instrument data associated with the first account; and
when the second encrypted shopper identifier credential is associated with a second account with the second payment instrument manager, receiving, by the application server, a second response from the second payment instrument manager that includes second payment instrument data associated with the second account.

17. The computer-implemented method of claim 16, wherein the first account comprises a set of payment instrument data that is associated with the specific user.

18. The computer-implemented method of claim 16, further comprising, after receiving the first response, sending a request to a payment processor for a payment settlement for the online transaction.

19. The computer-implemented method of claim 18, wherein the request to the payment processor includes at least a portion of the first payment instrument data associated with the first account.

20. The computer-implemented method of claim 16, further comprising, after receiving the first response from the first payment instrument manager, providing at least a portion of the first payment instrument data to the merchant associated with the online transaction.

21. The computer-implemented method of claim 16, further comprising, prior to receiving the first response from the first payment instrument manager, enabling display by the user computing device of an authorization user interface that is for receiving a one-time password and is associated with a payment method.

22. The computer-implemented method of claim 21, wherein the payment method is enabled by the first payment instrument manager.

23. The computer-implemented method of claim 21, further comprising, in response to receiving an indication that the first encrypted shopper identifier credential is associated with the first account with the first payment instrument manager, transmitting the one-time password to the user computing device.

24. The computer-implemented method of claim 16, wherein the sensitive information associated with the specific user includes one or more of credit card information, billing information, and personal identifiable information associated with the specific user.

* * * * *

UNITED STATES PATENT AND TRADEMARK OFFICE
CERTIFICATE OF CORRECTION

PATENT NO. : 11,922,409 B2
APPLICATION NO. : 18/127666
DATED : March 5, 2024
INVENTOR(S) : Erythean Martin et al.

It is certified that error appears in the above-identified patent and that said Letters Patent is hereby corrected as shown below:

In the Claims

In Column 18, Line 48:
In Claim 2, delete "transmit" and insert -- transmits --, therefor.

Signed and Sealed this
Fourth Day of June, 2024

Katherine Kelly Vidal
*Director of the United States Patent and Trademark Office*